US009014624B2

(12) United States Patent
 Manku

(10) Patent No.: US 9,014,624 B2
(45) Date of Patent: *Apr. 21, 2015

(54) METHOD AND APPARATUS FOR GENERATING DEDICATED DATA CHANNELS IN INDUCTIVE COUPLED RFID SYSTEMS

(75) Inventor: Tajinder Manku, Waterloo (CA)

(73) Assignee: Tag-Comm Inc., Waterloo (CA)

( * ) Notice: Subject to any disclaimer, the term of this patent is extended or adjusted under 35 U.S.C. 154(b) by 207 days.

This patent is subject to a terminal disclaimer.

(21) Appl. No.: 13/482,008

(22) Filed: May 29, 2012

(65) Prior Publication Data

US 2013/0324032 A1 Dec. 5, 2013

(51) Int. Cl.
*H04B 5/00* (2006.01)

(52) U.S. Cl.
CPC ............ *H04B 5/0062* (2013.01); *H04B 5/0075* (2013.01); *H04B 5/0081* (2013.01)

(58) Field of Classification Search
USPC ...................................... 455/77, 87, 120, 121
See application file for complete search history.

(56) References Cited

U.S. PATENT DOCUMENTS

| | | | | |
|---|---|---|---|---|
| 6,339,621 | B1* | 1/2002 | Cojocaru et al. | 375/247 |
| 8,384,519 | B2* | 2/2013 | Kuhl et al. | 340/10.1 |
| 2008/0246667 | A1* | 10/2008 | Symons | 343/702 |
| 2010/0052869 | A1* | 3/2010 | Stewart | 340/10.52 |
| 2012/0224657 | A1* | 9/2012 | Sasaki et al. | 375/326 |

OTHER PUBLICATIONS

Rehman, et al, "Switched Mode Transmitter Architecture using Low Pass Delta Sigma Modulator", IEEE 2011 7th International Conference on Emerging Technologies (ICET), pp. 1-6, Sep. 2011.*
Helaoui, et al, "A Novel Architecture of Delta-Sigma Modulator Enabling All-Digital Multiband Multistandard RF Transmitters Design", IEEE Transactions on Circuits and Systems vol. 55, No. 11, pp. 1129-1133, Nov. 2008.*
Sommarek, et al., "A Digital Modulator with Bandpass Delta-Sigma Modulator", Sold-State Circuits Conference, 2004, ESSCIRC 2004, Proceedings of the 30th European, pp. 159-162, Sep. 21-23, 2004.*
International Search Report and Written Opinion, Mailed Feb. 18, 2013, for Corresponding PCT International Patent Application No. PCT/CA2012/000568.
Ur Rehman, et al., "Switched Mode Transmitter Architecture Using Low Pass Delta Sigma Modulator", Emerging Technologies (ICET), 2001, 7th International Conference on, pp. 1-6, Sep. 5-6, 2011.

\* cited by examiner

*Primary Examiner* — Lewis West
(74) *Attorney, Agent, or Firm* — Gowling Lafleur Henderson LLP

(57) ABSTRACT

An inductive coupling apparatus for modifying an incoming radio frequency (RF) signal includes an inductive element for modifying the incoming RF signal in accordance with a coupled impedance characteristic of the inductive element. A variable impedance circuit includes an output electrically coupled to the inductive element. A low pass delta sigma modulator is coupled to the variable impedance circuit and digitally controls the output of the variable impedance circuit, the coupled impedance of the inductive element being adjusted based on the output of the variable impedance circuit.

20 Claims, 9 Drawing Sheets

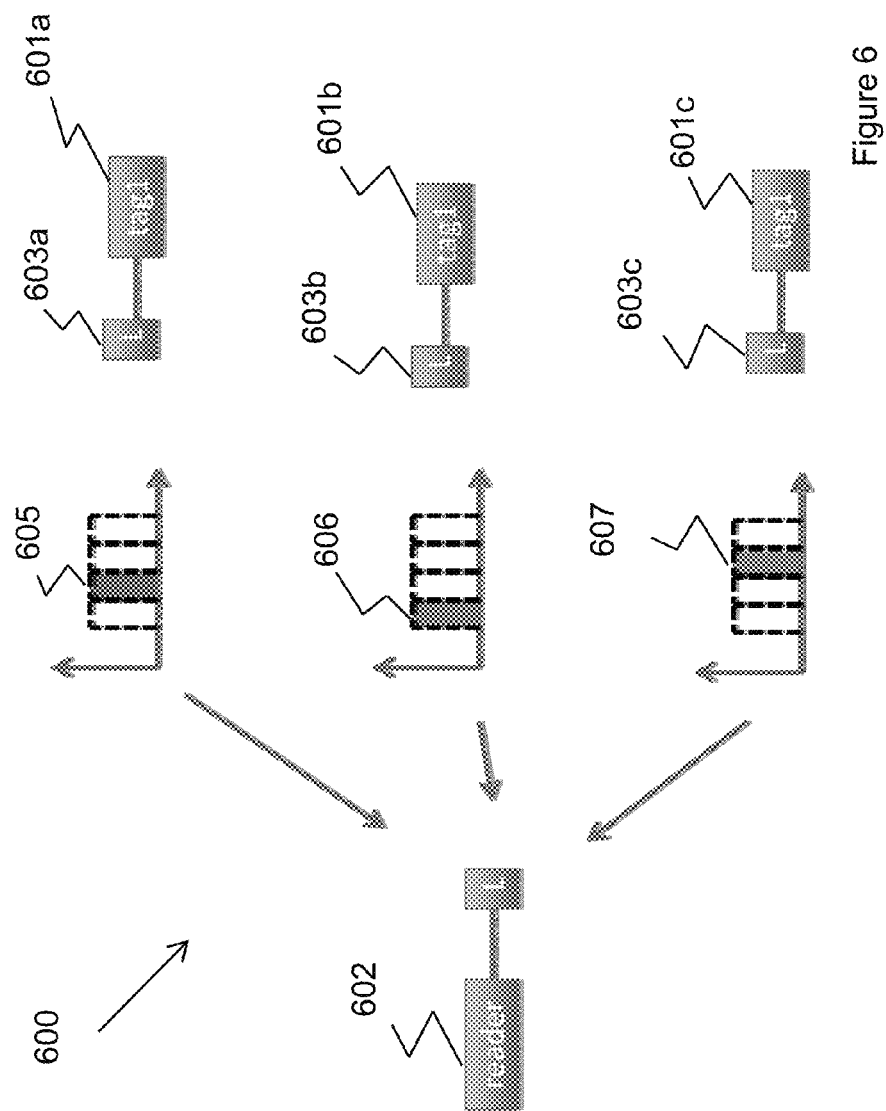

METHOD AND APPARATUS FOR GENERATING DEDICATED DATA CHANNELS IN INDUCTIVE COUPLED RFID SYSTEMS

FIELD OF THE INVENTION

The present invention relates generally to a method and apparatus for generating dedicated data transmission channels in inductive or magnetic coupled radio frequency communication networks.

BACKGROUND OF THE INVENTION

Radio Frequency Identification (RFID) systems are commonly used to locate and track items in a near-field communication network including a reader device and at least one wireless terminal, or tag. Energized time-varying electromagnetic radio frequency (RF) waves, which comprise the carrier signal, are transmitted from the reader to the tags in a given RFID network or system. Inductive coupling may be used to transfer energy from one circuit (such as a conductive antenna coil and associated circuitry) to another by means of mutual inductance between the two circuits. A voltage is induced in the tag that can be rectified and used to power the tag circuitry. RFID networks may include tags and readers which exchange information using such inductive coupling between their inductive coupling coils (or antenna coils). To enable data to be passed from the tag to the reader, the tag circuitry changes the load, which is referred to herein as the coupled impedance, associated with its inductive coupling coil. This change can be detected by the reader as a result of the mutual inductive coupling, whereby a reader-originated RF signal can be modified back to the reader, the modified signal being modulated by the tag to transmit encoded data.

FIG. 1 depicts a prior art RFID system in which data transmission from tags 101a-c to reader device 103 is performed on a same frequency channel or spectrum 104. Using the established inductive coupling technology, each of the plurality of tags typically in the RFID system or network sends RF signals on the same carrier signal used for inductive coupling. Hence, the inductive coupling RF signals from each tag overlap those of other tags within the same RF spectrum associated with that given reader device/ RFID network.

As a consequence, tag collision in RFID systems occur when the multiple tags are energized by the same RFID reader device, and simultaneously couple their respective, overlapping signals back to the reader using the given frequency channel. Thus the tag collision problem is exacerbated whenever a large number of tags must be read together in the same RF field. The reader is unable to differentiate these signals when the simultaneously generated signals collide. The tag collisions confuse the reader, generate data transmission errors, and generally reduce data throughput within the RFID system or network.

Various systems have been proposed to isolate individual tags. For example, in one technique aimed at reducing collision errors, when the reader recognizes that tag collision has taken place, it sends a special "gap pulse" signal. Upon receiving this signal, each tag consults a random number counter to determine the interval to wait before sending its data. Since each tag gets a unique number interval, the tags send their data at different times. The adverse impact on overall RFID system performance, in terms of data throughput rate, however, still exists.

Modulating the signal received by the tag and inductively coupling the modulated signal to the reader device is known, using such signal modulation schemes as phase shift keying (PSK) and amplitude shift keying (ASK), where the tag changes its coupled impedance by changing the impedance match between states. However, the adverse effects of tag collisions resulting from overlapping modified signals on a given frequency channel still remain.

SUMMARY OF THE INVENTION

Provided is an inductive coupling apparatus for modifying an incoming radio frequency (RF) signal. The inductive coupling apparatus comprises an inductive element, a variable impedance circuit having an output electrically coupled to the inductive element, and at least one low pass delta sigma ($\Delta\Sigma$) modulator coupled to the variable impedance circuit and digitally controlling the output of the variable impedance circuit, wherein the for modifying the incoming RF signal is modified as the coupled impedance of the inductive element is adjusted in accordance with the output of the variable impedance circuit.

In one embodiment, an output of the at least one low pass delta sigma modulator switches the output of the variable impedance circuit between at least two states to adjust the coupled impedance Z.

In another embodiment, an input signal applied to the low pass delta sigma modulator consists of one of a complex modulation signal offset from the incoming radio frequency signal by $+/-\omega_0$.

The complex modulation signal may consists of any of a GMSK, QPSK, nPSK, nQAM, and an OFDM signal.

In yet another embodiment, the inductive coupling apparatus further comprises at least a second low pass delta sigma modulator coupled to the variable impedance circuit, wherein the output of the variable impedance circuit is further digitally controlled by the second low pass delta sigma modulator.

In a further embodiment, input signals to the first and second low pass delta sigma modulators of the inductive coupling apparatus comprise in-phase (I) and quadrature (Q) signals respectively.

BRIEF DESCRIPTION OF THE DRAWINGS

The invention will now be described by way of example only with reference to the following drawings in which:

FIG. 5b shows a representative output signal of the SSB signals generated using the interleaved modulator apparatus of FIG. 5a;

FIG. 6 shows an embodiment of an RFID system in which data transmission, via inductive coupling between tag and reader, is performed on dedicated frequency channels;

FIG. 7b shows a representation of quadrature errors which may be produced in a modified signal generated using the modulator apparatus of FIG. 7a.

DETAILED DESCRIPTION

The term modulation as used herein refers to the process by which the radio frequency identification (RFID) wireless terminal, or tag, changes the carrier radio frequency (RF) signal of the reader inductive coupling apparatus to encode and convey information. For instance, in phase modulation, data being transmitted from the reader device to the tag is encoded in changes in the phase of the carrier wave sent out by the RFID reader device.

Figure 1:
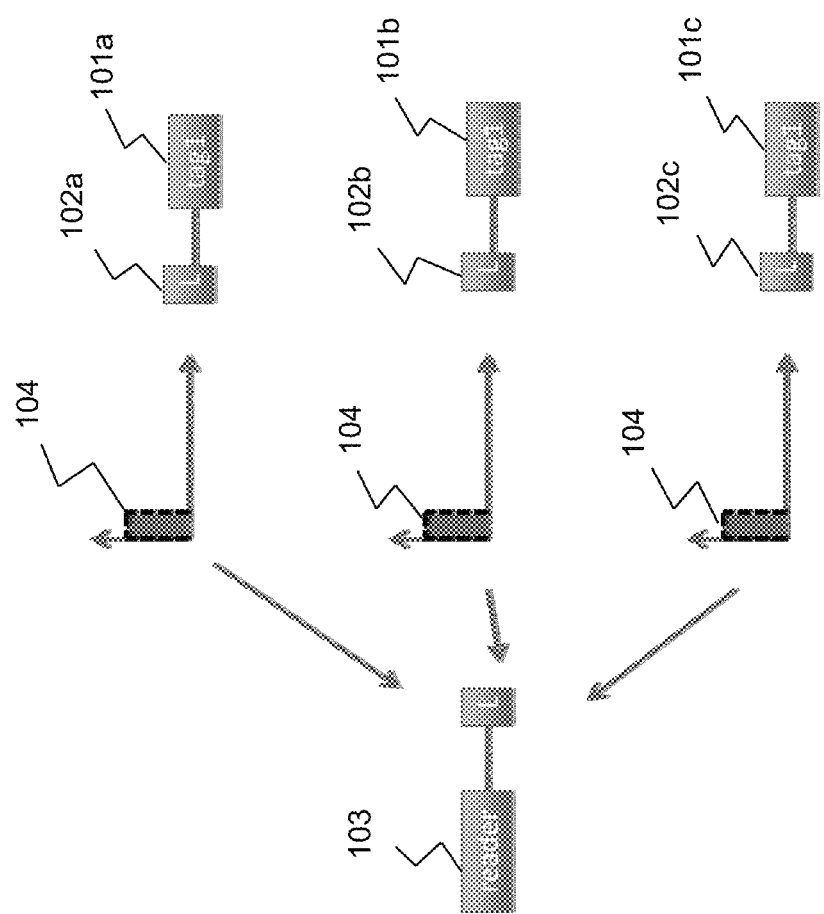
FIG. 1 shows a prior art inductive coupled RFID system in which data transmission from tag to reader is performed on a same frequency channel.
Figure 2:
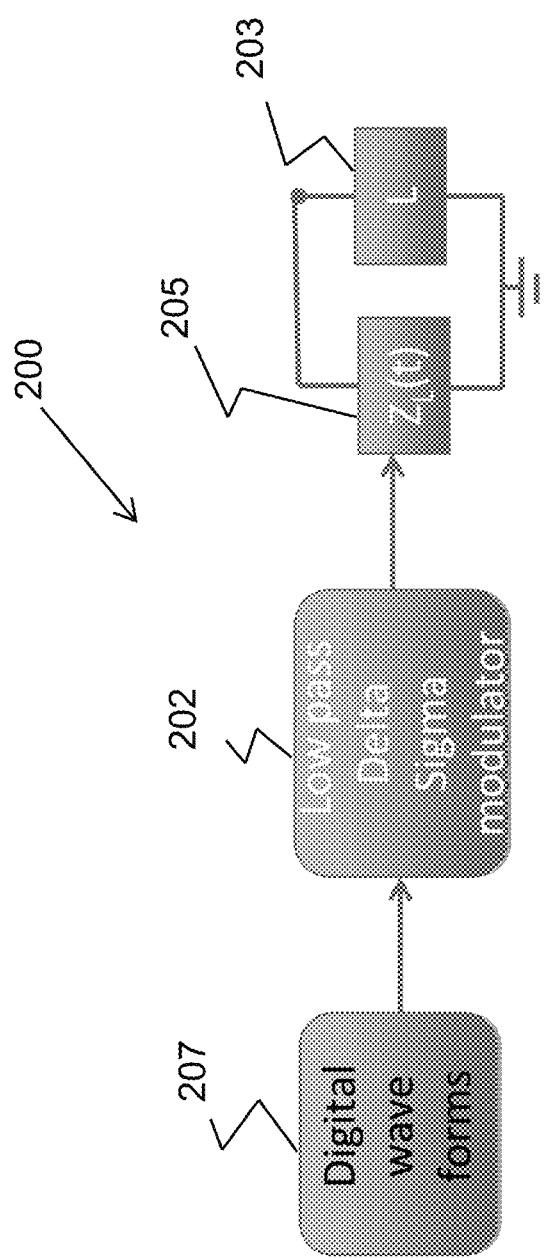
FIG. 2 shows, in one embodiment, an apparatus for generating a varying impedance coupled to the inductive element.

FIG. 2 shows, in one embodiment, an inductive coupling apparatus 200 of a wireless communication system, such as a radio frequency identification (RFID) communication network, which may be passive or semi-passive, for generating a varying impedance 205 at inductive element 203 to modify an incoming radio frequency (RF) signal such as from a reader device of the RFID network. Inductive element 203, which may be part of a tag terminal of the RFID communication network, modifies the incoming RF signal in accordance with its time-varying coupled impedance characteristic $Z_L$ (t). Here digital waveform 207 is applied to a single bit low pass delta sigma ($\Delta\Sigma$) modulator 202. The output of single bit low pass $\Delta\Sigma$ modulator 202 is applied to control at least two states of the varying impedance 205.

Figure 3:
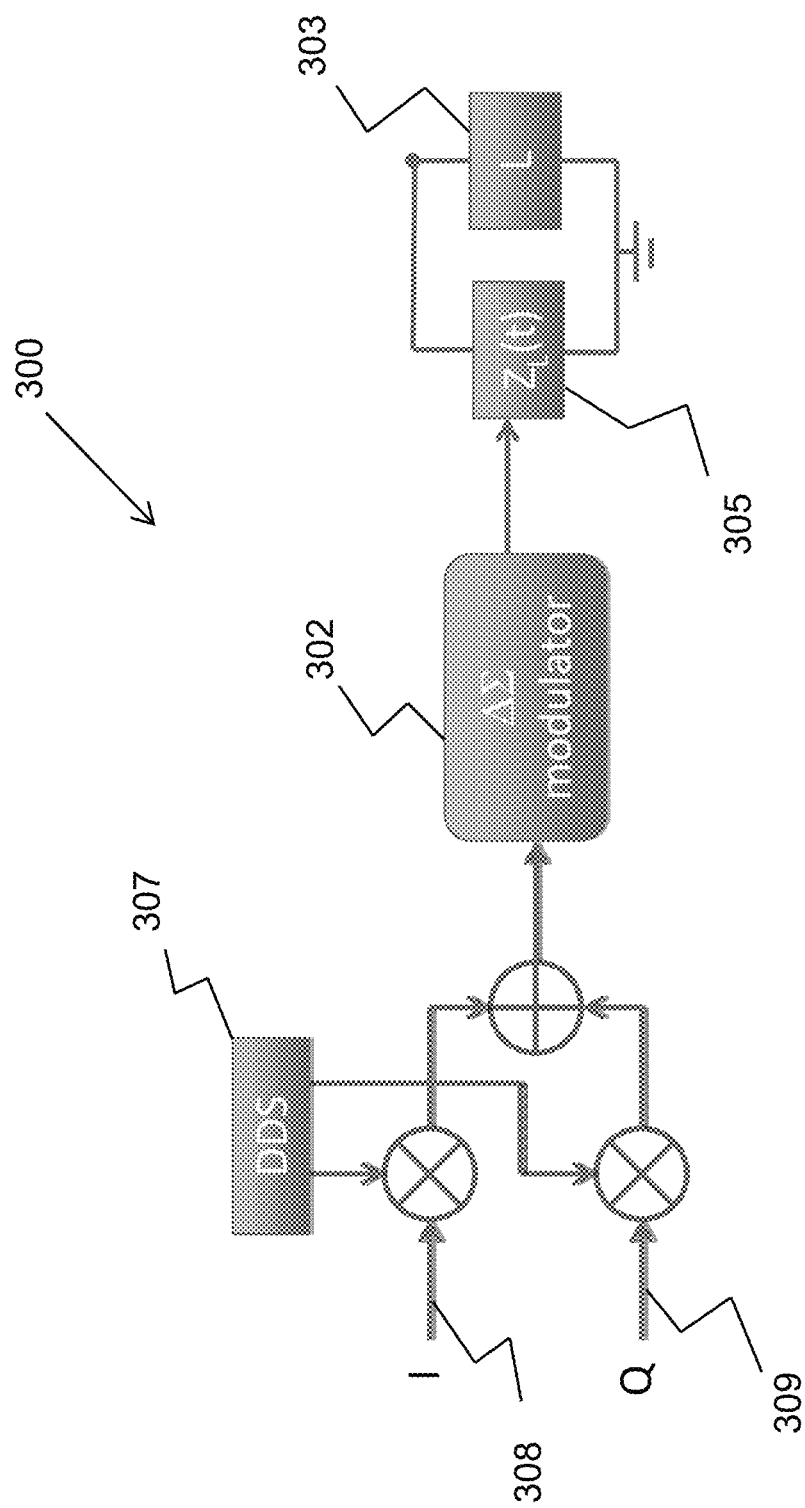
FIG. 3 shows, in one embodiment, an apparatus for generating an IQ signal offset by the frequency of a digital signal source such as a Direct Digital Synthesizer.

FIG. 3 shows, in one embodiment, apparatus 300 for generating an In-Phase—Quadrature (IQ) signal (308, 309) offset by the frequency of a digital signal source which in one embodiment may be Direct Digital Synthesizer (DDS) 307. The signals (308, 309) to the mixers are generated by DDS 307. A low pass delta sigma ($\Delta\Sigma$) modulator 302 may be applied to generate a complex modulation signal. As referred to herein, the low pass delta sigma modulator generates an output bit stream that represents the input data from a DC level to some predetermined design bandwidth, BW. Beyond the predetermined design bandwidth BW, quantized noise of the low pass delta sigma increases until at some design cutoff point, the signal would be deemed to have too much quantization noise.

In an embodiment, one or more filters may be in the variable impedance circuit to filter out of band noise output from low pass delta sigma modulator 302.

Figure 4:
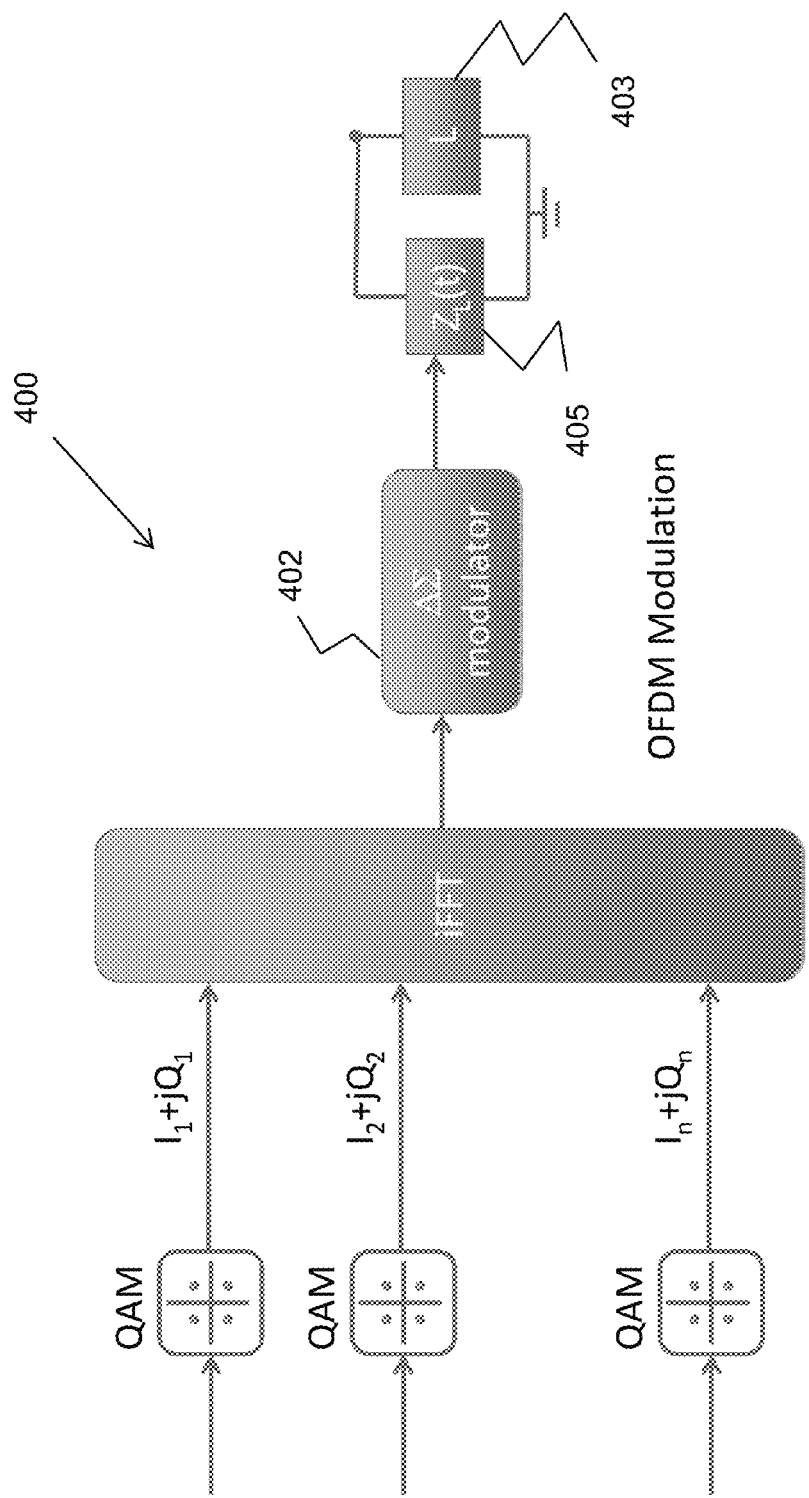
FIG. 4 shows, in one embodiment, an apparatus for generating an OFDM signal offset by the frequency of a digital signal source such as a Direct Digital Synthesizer.

FIG. 4 shows, in one embodiment, apparatus 400 for generating an orthogonal frequency division multiplexing (OFDM) signal offset by the frequency of a digital signal source.

In the examples of FIGS. 3 and 4, the complex modulation signals are generated at $f_{rf}+\delta f$ and $f_{rf}-\delta f$; i.e. they are double side banded and have a lower and upper side band.

Figure 5A:
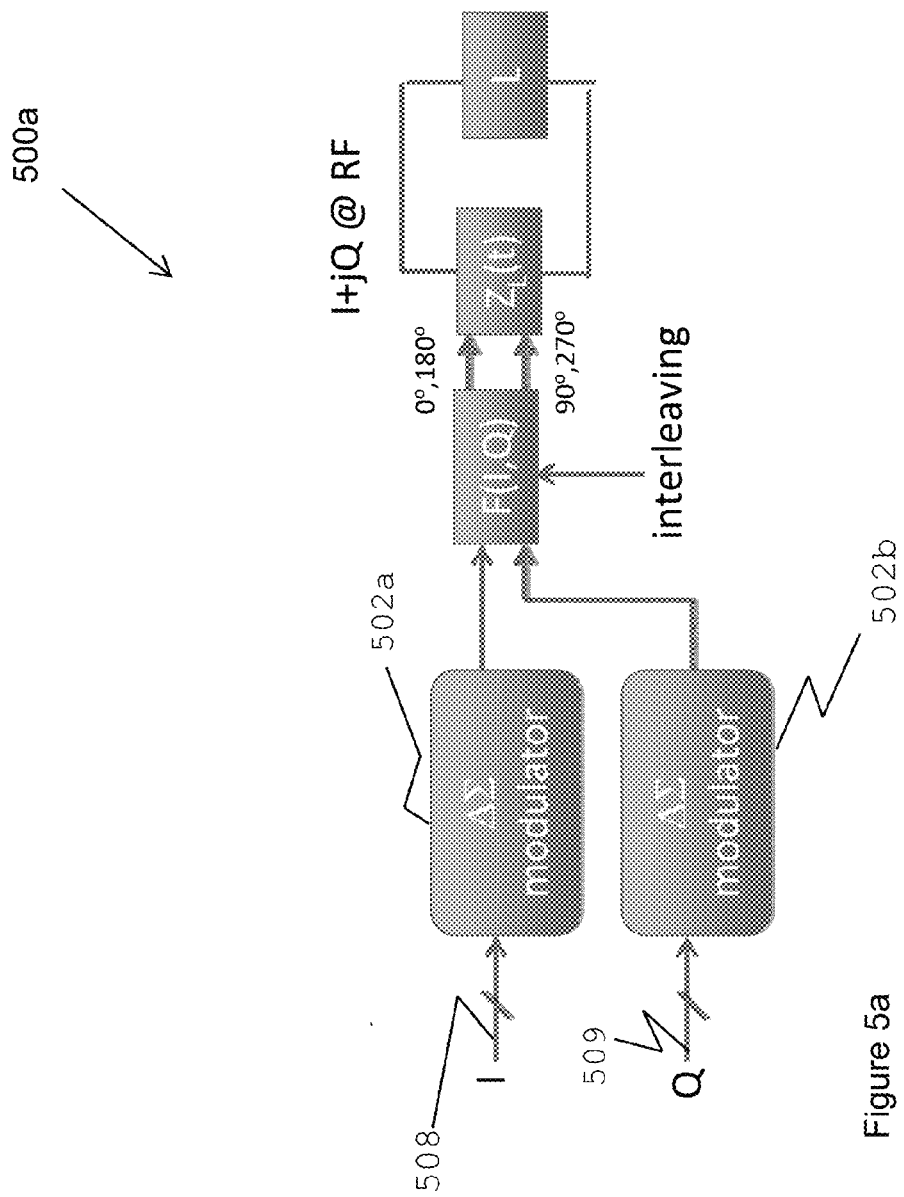
FIG. 5a shows, in one embodiment, an interleaved modulator apparatus for generating SSB signals based on IQ signal inputs.

FIG. 5a shows, in one embodiment, interleaved modulator apparatus 500a for generating SSB signals based on IQ signal inputs 508,509. Single side band (SSB) signals can be generated using two interleaved low pass $\Delta\Sigma$ modulators 502a, 502b.

The two interleaved $\Delta\Sigma$ modulators 502a, 502b provide signals that either change Z by 0, 90, 180, or 270° (or in general offset+0, offset+90, offset+180, or offset+270); see FIG. 5a. The input signals to the interleaved first and second low pass delta sigma modulators 502a, 502b may comprise in-phase (I) and quadrature (Q) signals 508, 509 respectively. In one embodiment, the input signal applied to the interleaved low pass delta sigma modulators 502a, 502b consists of a complex modulation signal offset from the incoming radio frequency signal by $+\omega_0$ or $-\omega_0$ or zero.

Still in regard to FIG. 5a, the first $\Delta\Sigma$ (i.e. $(\Delta\Sigma)_I$) has an output that either changes Z by 0 or 180° and the other $\Delta\Sigma$ (i.e. $(\Delta\Sigma)_Q$) by 90 or 270°. However, the outputs are interleaved, alternately switching between the first $\Delta\Sigma$ and the second $\Delta\Sigma$. So if $(\Delta\Sigma)_I$ generates 0, 180, 180, 0, 0, 180 . . . and $(\Delta\Sigma)_Q$ generates 90, 90,270,270, . . . then Z is controlled to change by 0, 90, 180, 90, 180, 270, 0, 270, . . . . By using this architecture SSB signals may be generated.

Figure 5B:
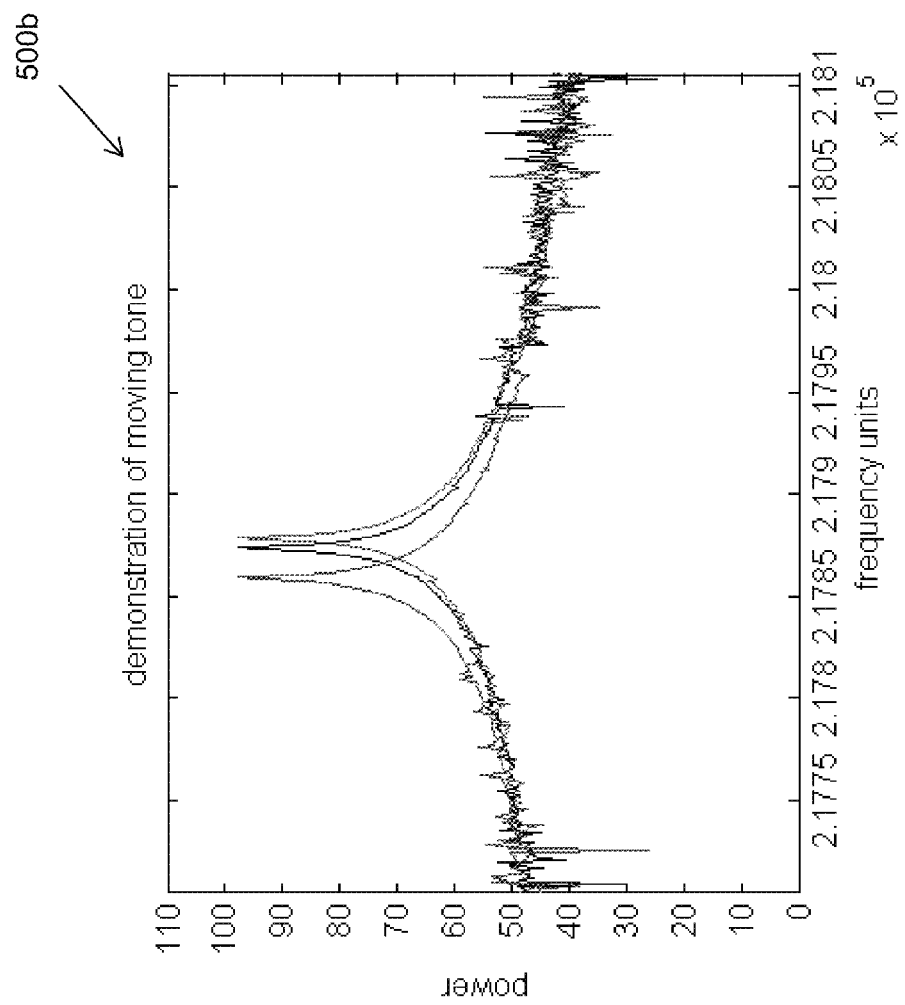

FIG. 5b shows a representative output signal 500b of the SSB signals generated using the modulator apparatus 500a of FIG. 5a. FIG. 5b shows the output of such a structure where the signal applied to it is $\sin\omega_{bb}t$ and $\cos\omega_{bb}t$ to the $(\Delta\Sigma)_I$ and $(\Delta\Sigma)_Q$ modulator, respectively. Here $\omega_{bb}$ is being changed to three different frequencies.

If there are any errors in Z, this will result in an effective IQ offset in the modified signal. However, this can be corrected within the reader device using known IQ correction schemes. If the inductive element impedance changes, one can apply equalization on the RFID reader.

FIG. 6 shows an embodiment of an RFID communication network 600 in which data transmission from tag to reader is performed on dedicated frequency channels using the complex modulation apparatus and method for low pass delta sigma modulation, by generating separate frequency channels 605, 606, 607 for respective ones of tags 601a-c used for data communication in RFID communication network 600. The complex modulation method and apparatus for low pass delta sigma modulation of the coupled impedance are herein referred to, and denoted, as "the Z-$\Delta\Sigma$ scheme". Inductive elements 603a-c in respective ones of tag terminals 601a-c modify the incoming RF signal, such as from reader device 602, in accordance with a coupled impedance characteristic, Z, of the inductive element 603a-c. A variable impedance circuit (not shown in FIG. 6) has an output electrically connected to the inductive element 603a-c. A low pass delta sigma modulator is coupled to an input of the variable impedance circuit to digitally control the output of the variable impedance circuit, such that coupled impedance Z of inductive element 603a-c may be adjusted by changing the output of the variable impedance circuit.

Figure 7A:
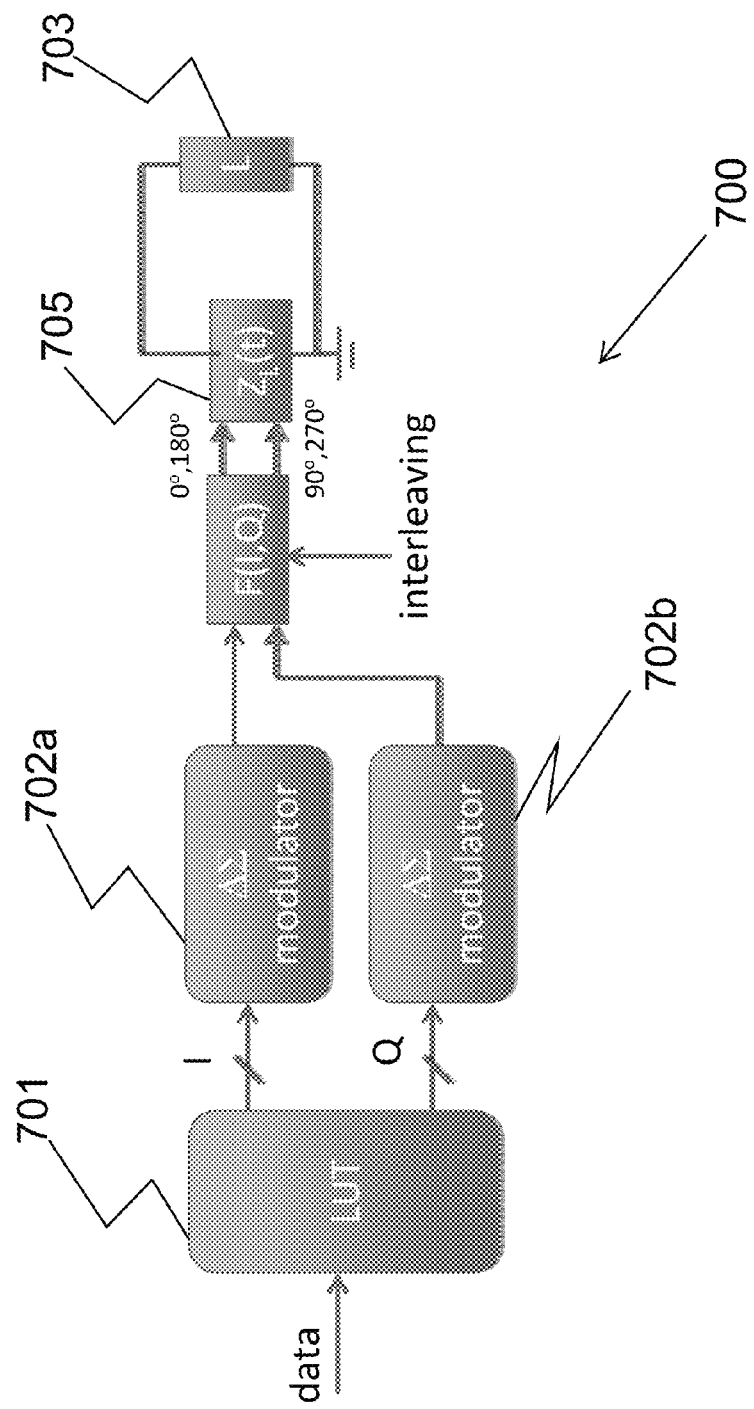
FIG. 7a shows, in one embodiment, an inductive coupling modulator apparatus for generating a QAM signal.

FIG. 7a shows, in one embodiment, modulator apparatus 700 for generating quadrature amplitude (QAM) signals. Data bits are applied to LUT (Look Up Table) 701 and then applied to $\Delta\Sigma$ modulators 702a, 702b.

By applying the SSB scheme, complex modulation signals like GMSK, nPSK, quadrature phase shift keying (QPSK), OFDM, nQAM, etc. may be generated, where n represents an integer.

In one embodiment, the output of low pass delta sigma modulators 702a, 702b may be a return to zero (RTZ), so if the data is 1101101, the output would be 10100010100010; note there is a zero between each bit. In an alternate embodiment, the output of low pass delta sigma modulator 702a, 702b may be a non-return to zero (NRZ) type signal; for example, if the data is 1101101, the output is 1101101, and nothing is added to the data stream.

The phases of $Z_{in}$ may have errors; i.e. $Z_0\exp(j0°)$, $(Z_0+\epsilon_1)\exp(j(180°+\phi_1))$, $(Z_0+\epsilon_2)\exp(j(90°+\phi_2))$, and $(Z_0+\epsilon_3)\exp(j(270°+\phi_3))$, where $\epsilon_1, \phi_1, \epsilon_2, \phi_2, \epsilon_3,$ and $\Phi_3$ represent the errors, and $Z_0$ is some reference impedance. These errors produce a quadrature error in the signal modified back by the inductive element.

Figure 7B:
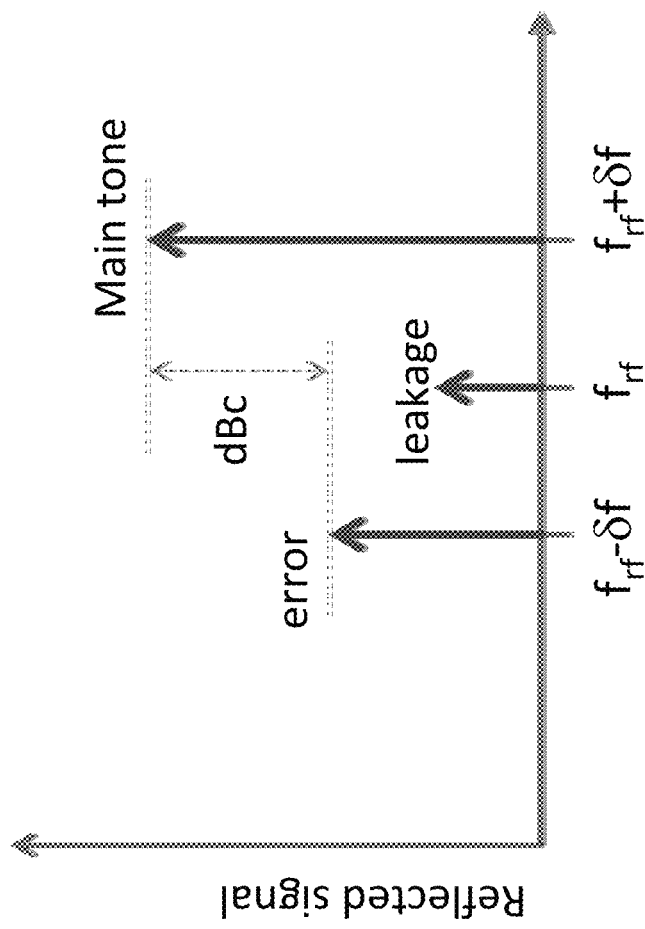

FIG. 7b is a representation of the modified signal if a SSB is generated at an offset of $\delta f$. The error tone at $-\delta f$ is produced due to this error; ideally the error signal would not exist. This quadrature error can be corrected by adjustments either (i) to the I and Q signals applied to the low pass delta sigma modulators, or (ii) within the reader of the RFID communication network itself.

For instance, in the reader what is measured is $E(Q^2)-E(I^2)$ and $E(IQ)$, where $E(x)$ is the average expected value. The term $E(Q^2)-E(I^2)$ is a measure of the gain mismatch, and $E(IQ)$ is a measure of the phase mismatch. The gain on the I (or Q) channel may be corrected until $E(Q^2)-E(I^2)=0$, and the phase so $E(IQ)=0$. This may be done in a closed loop scheme, for example using a Least Mean Square filter.

The matrix used to product the corrected I and Q values is:

$$Icorrected = I*D$$

$$Qcorrected = \sin(phase\_error)*I + \cos(phase\_error)*Q$$

where D is a measure of the gain mismatch between I and Q, and phase_error is the error in phase between I and Q. Without any error, $D=1$ and phase_error=0°.

With regard to the clocking function utilized by the wireless tag terminal, such as for driving the low pass delta sigma modulator, generation of the clocking function may be provided by a clock circuit within the tag reader, or via a clock circuit generation based on the frequency of the incoming RF signal provided by the reader device of the RFID network.

For example, in the instance of using the signal from the read as the clock, if the reader is at $f_{rf}$, the clock used by the tag will be $f_{rf}$, or some frequency, $f_{rf}/N$, where N is some integer (that is $f_{rf}$ is divided by N to generate a clock).

Although preferred embodiments of the invention have been described herein with regard to passive and semi-passive RFID communication networks, it is contemplated, and indeed it will be understood by those skilled in the art, that the solutions presented herein may be applied to other aspects of wireless communication. Accordingly, a person of ordinary skill in the art would understand that the specific embodiments described herein, while illustrative are not necessarily comprehensive. For instance, it is contemplated that the bitstream of the low pass delta sigma modulator described herein may be substituted by a similar bitstream from a pulse width modulated system. These, and other various modifications, may be made those skilled in the art without departing from the scope of the invention as defined by the claims.

What is claimed is:

1. An inductive coupling apparatus for modifying an incoming radio frequency (RF) signal comprising:
   an inductive element;
   a variable impedance circuit having an output electrically coupled to the inductive element; and
   at least one low pass delta sigma ($\Delta\Sigma$) modulator coupled to the variable impedance circuit and digitally controlling the output of the variable impedance circuit;
   wherein the incoming RF signal is modified as the coupled impedance (Z) of the inductive element is adjusted in accordance with the output of the variable impedance circuit.

2. The inductive coupling apparatus of claim 1 wherein an output of the at least one low pass delta sigma modulator switches the output of the variable impedance circuit between at least two states to adjust the coupled impedance.

3. The inductive coupling apparatus of claim 1 wherein an input signal applied to the low pass delta sigma modulator comprises a complex modulation signal offset from the incoming radio frequency signal by $+/-\omega_0$.

4. The inductive coupling apparatus of claim 3 wherein the complex modulation signal consists of one of a GMSK, QPSK, nPSK, nQAM, and an OFDM signal.

5. The inductive coupling apparatus of claim 1 wherein an output of the low pass delta sigma modulator is one of a return to zero (RTZ) and a non-return to zero (NRZ) type signal.

6. The inductive coupling apparatus of claim 1 further comprising at least a second low pass delta sigma modulator coupled to the variable impedance circuit, wherein the output of the variable impedance circuit is further digitally controlled by the at least a second low pass delta sigma modulator.

7. The inductive coupling apparatus of claim 6 wherein input signals to the first and second low pass delta sigma modulators comprise in-phase (I) and quadrature (Q) signals respectively.

8. The inductive coupling apparatus of claim 6 wherein a combined output of the first and second said low pass delta sigma modulators switches the output of the variable impedance circuit between four states to adjust the coupled impedance of the inductive element.

9. The inductive coupling apparatus of claim 8 wherein the coupled impedance comprises four states which are relative from each other by) $Z_0\exp(j0°)$, $Z_0\exp(j180°)$, $Z_0\exp(j90°)$, and $Z_0\exp(j270°)$.

10. The inductive coupling apparatus of claim 9 wherein the first said low pass delta sigma modulator $((\Delta\Sigma)_I)$ switches the states between 0 degrees and 180 degrees.

11. The inductive coupling apparatus of claim 10 wherein the second low pass delta sigma modulator $((\Delta\Sigma)_Q)$ switches the states between 90 degrees and 270 degrees.

12. The inductive coupling apparatus of claim 11 wherein outputs of the first and second low pass delta sigma modulators alternately switch between each other, wherein if $(\Delta\Sigma)_I$ generates 0, 180, 180, 0, 0, 180 ... and $(\Delta\Sigma)_Q$ generates 90, 90, 270, 270, ..., Z is controlled to adjust by 0, 90, 180, 90, 180, 270, 0, 270, ....

13. The inductive coupling apparatus of claim 6 wherein the input signals applied to the low pass delta sigma modulators comprise sine and cosine wave forms offset from a frequency of the incoming RF signal by $\omega_1$, where $\omega_1$ can be either positive or negative.

14. The inductive coupling apparatus of claim 6 wherein the input signals applied to the low pass delta sigma modulators consists of a complex modulation signal offset from a frequency of the incoming RF signal by one of $+\omega_0$, $\omega_0$ and zero.

15. The inductive coupling apparatus of claim 14 wherein the complex modulation signal consists of one of a GMSK, nPSK, QPSK, nQAM, and OFDM signal.

16. The inductive coupling apparatus of claim 6 wherein outputs of the low pass delta sigma modulators consist of one of a return to zero (RTZ) and a non-return to zero (NRZ) type signal.

17. The inductive coupling apparatus of claim 7 wherein the I and Q signals are adjusted to compensate for errors that may arise in generating $Z_0\exp(j0°)$, $Z_0\exp(j180°)$, $Z_0 \exp(j90°)$, and $Z_0\exp(j270°)$.

18. The inductive coupling apparatus of claim 17 wherein the errors are compensated for in a radio frequency identification (RFID) reader device electromagnetically coupled to the inductive element.

19. The inductive coupling apparatus of claim 1 further comprising at least one filter device at the variable impedance circuit to filter out of band noise output from the at least one low pass delta sigma modulator.

20. The inductive coupling apparatus of claim 1 wherein the inductive element comprises part of a tag terminal, the tag terminal electromagnetically coupled to a reader device within a radio frequency identification (RFID) system, the reader device providing the incoming RF signal at a carrier signal frequency, the RFID system comprising clocking the low pass delta sigma modulator, generation of the clocking consisting of one of a clock circuit within the tag reader and a clock circuit generated based on the carrier signal frequency.

* * * * *